(12) United States Patent
Shirakawa

(10) Patent No.: US 6,534,953 B2
(45) Date of Patent: Mar. 18, 2003

(54) BATTERY CHARGING APPARATUS, BATTERY PACK AND METHOD FOR CHARGING SECONDARY BATTERY

(75) Inventor: Hiroshi Shirakawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/777,402

(22) Filed: Feb. 6, 2001

(65) Prior Publication Data

US 2001/0015634 A1 Aug. 23, 2001

(30) Foreign Application Priority Data

Feb. 8, 2000 (JP) ........................................ 2000-035668

(51) Int. Cl.[7] ................................................. H02J 7/00
(52) U.S. Cl. ....................................................... 320/114
(58) Field of Search ................................. 320/114, 107, 320/162; 429/7, 9, 96–100, 123

(56) References Cited

U.S. PATENT DOCUMENTS 5,733,674 A * 3/1998 Law et al. .................. 320/125
6,288,522 B1 * 5/2000 Odaohhara et al. ......... 320/138
6,163,131 A * 12/2000 Gartstein et al. ........... 320/118
6,184,654 B1 * 2/2001 Bachner, III et al. ....... 320/114

* cited by examiner

Primary Examiner—Edward H. Tso
Assistant Examiner—Pia Tibbits
(74) Attorney, Agent, or Firm—Jay H. Maioli

(57) ABSTRACT

In order to reduce the charging time required for charging, there is provided a battery pack having a battery cell that supplies current to an electronic apparatus which is connected thereto or is charged by the supply of current from another power source, and a charge/discharge control section that controls the charging operation of the battery cell. The charge/discharge control section further includes a voltage sensing circuit that monitors the output voltage of an AC adapter, a protection circuit that senses the voltage between terminals of the battery cell and a control circuit that controls the charging operation. The battery pack is charged by using a charging apparatus having a charging adapter that has insertion slots for incorporating the battery pack and the AC adapter that generates the charge current.

8 Claims, 4 Drawing Sheets

BATTERY CHARGING APPARATUS, BATTERY PACK AND METHOD FOR CHARGING SECONDARY BATTERY

BACKGROUND OF THE INVENTION

1. Field of the Invention

The present invention relates to a charging apparatus for charging a battery pack provided with a rechargeable battery, a battery pack, and a rechargeable battery charging method.

2. Description of the Related Art

It is advantageous that various portable electronic apparatuses, such as a portable telephone and a lap-top computer, could be used over an extended period of time even after being disconnected from commercial power lines. For this purpose, measures are have been taken for increasing the power storage capacity of an exchangeable battery pack used as the power source to drive an electronic apparatus, as well as for decreasing the power consumption of the electronic apparatus.

In portable telephones, in particular, the trend is toward greater power consumption as the portable telephone provides an increasing variety of functions and is used at an increasing frequency due to the increasing variety of services provided via the portable telephone. However, they are still required to be capable of operating over a longer period of time even in such a situation.

Thus, users carry replacement battery packs to enable operation over a long period of time. A charging apparatus having a plurality of charging slots may also be used to charge a plurality of battery packs.

Battery packs of the prior art are charged by, for example, combining constant current charging and constant voltage charging. That is, the battery pack is charged in constant current charging until the voltage thereof reaches a predetermined voltage level, following by constant voltage charging for a predetermined period of time. Current flowing in the charging apparatus during constant current charging is determined by an AC adapter being used.

However, even when the charging apparatus has two charging slots, in the case where only one charging circuit is provided, the time required to fully charge both battery packs becomes twice the time required for fully charging one battery pack. This situation is no different than a case of sequentially charging two battery packs one by one using a charging apparatus having a single charging slot.

In order to make it possible to charge two battery packs simultaneously and reduce the charging time at the same time, two charging circuits may be provided, but this makes the charging apparatus more expensive and increases the size thereof, thus creating a problem in manufacturing a compact charging apparatus.

BRIEF SUMMARY OF THE INVENTION

The present invention has been proposed in view of the problems of the prior art described above, and an object thereof is to provide a charging apparatus that is capable of reducing the charging time when charging a plurality of battery packs and that can also be made smaller in size. Also provided is a battery pack and a battery charging method.

In order to achieve the object described above, the charging apparatus of the present invention comprises a plurality of battery insertion sections into which a plurality of battery packs having a charge control capability and/or an electronic apparatus incorporating the battery pack are inserted, and a power source for supplying charge current, wherein the charge current from the power source is supplied to the battery packs and/or the electronic apparatus inserted into the battery insertion sections in parallel.

The charge control function refers to a function to start the charging operation, when the output voltage of the power source exceeds a predetermined threshold.

The charging apparatus described above applies the output voltage of the power source to the battery insertion sections in parallel.

In order to achieve the object described above, the battery pack of the present invention comprises a rechargeable battery wherein charging and discharging occur and a charge control section for sensing the output voltage of a charge power source to control the start and stop of charging, wherein the battery pack is connected in parallel with another battery pack or packs to the charge power source, and the charge control section senses a change in the output voltage due to charging of the other battery packs to control the start and stop of the charging operation.

The charge control section may start the charging operation when the output voltage exceeds a predetermined threshold.

The battery pack described above is connected in parallel with the other battery pack to the charge power source, and the charge control section senses a change in the output voltage of the charge power source due to charging of the other battery pack to control the start and stop of the charging operation.

In order to achieve the object described above, the rechargeable battery charging method of the present invention for charging a plurality of battery packs each provided with the secondary battery comprises a current supply step for sensing a charge current from the charge power source is supplied to the plurality of battery packs in parallel and a charge control process wherein a change in the output voltage of the charge power source due to charging of at least one battery pack among the plurality of battery packs to control the start and stop of charging the other battery pack.

In the charge control step, the charging operation may be started when the output voltage exceeds a predetermined threshold.

In the charge control step, the charging operation may also be switched between constant current charging and constant voltage charging according to the voltage level of the plurality of battery packs.

Further, the plurality of battery packs are charged individually in the constant current charging operation and the plurality of battery packs are charged simultaneously in the constant voltage charging operation, while the constant voltage charging operation for all battery packs is started when the voltages levels of all of the plurality of battery packs reach a predetermined voltage level.

According to the rechargeable battery charging method described above, in the charge control step, a change in the output voltage of the charge power source due to charging of at least one battery pack among the plurality of battery packs is sensed to control the start and stop of charging the other battery pack.

The charging apparatus of the present invention comprises a plurality of battery insertion sections into which a plurality of battery packs having the charge control function to control charging of the rechargeable battery and/or the electronic apparatus incorporating the battery pack are inserted, and a power source for supplying charge current, wherein the charge current from the power source is supplied to the battery packs and/or the electronic apparatus inserted into the battery insertion sections in parallel.

The charge control function may be a function to start the charging operation when the output voltage of the power source exceeds a predetermined threshold.

As a consequence, the charging apparatus described above can not only be made smaller in size due to the simpler construction thereof but can also to reduce the manufacturing cost. The charging apparatus is also capable of charging a plurality of battery packs simultaneously with a constant voltage. Thus it is possible to reduce the charging time when charging a plurality of battery packs without installing an additional charging circuit.

The battery pack of the present invention comprises a rechargeable battery wherein charging and discharging occur and a charge control section for sensing the output voltage of the charge power source to control the start and stop of charging, wherein the battery pack is connected in parallel with another battery pack to the charge power source, and the charge control section senses a change in the output voltage due to charging of the other battery pack to control the start and stop of the charging operation.

The charge control section may start the charging operation when the output voltage exceeds a predetermined threshold.

Therefore, the battery pack described above makes it possible to reduce the charging time.

The rechargeable battery charging method of the present invention for charging a plurality of battery packs each provided with a rechargeable battery comprises a current supply step for supplying a charge current from a charge power source to the plurality of battery packs in parallel and a charge control step for sensing a change in the output voltage of the charge power source due to charging of at least one battery pack among the plurality of battery packs to control the start and stop of charging the other battery pack.

In the charge control step, the charging operation may be started when the output voltage exceeds a predetermined threshold.

In the charge control step, the charging operation is switched between constant current charging and constant voltage charging according to the voltage level of the plurality of battery packs.

Further, the plurality of battery packs are charged individually in the constant current charging operation and the plurality of battery packs are charged simultaneously in the constant voltage charging operation, while the constant voltage charging operation for all the battery packs is started when the voltage levels of all of the plurality of battery packs reach a predetermined voltage level.

Thus the rechargeable battery charging method described above allows not only making the charging apparatus smaller in size due to the simpler construction thereof but also reducing the manufacturing cost. The rechargeable battery charging method is also capable of charging a plurality of battery packs simultaneously with a constant voltage. Thus, it is possible to reduce the charging time when charging a plurality of battery packs without installing an additional charging circuit to the charging apparatus.

DETAILED DESCRIPTION OF THE INVENTION

The rechargeable battery charging method described below as an embodiment of the present invention is a method of charging a battery pack comprising a rechargeable battery and a charge control section by using a charging apparatus that comprises battery insertion sections or slots, wherein a plurality of battery packs and electronic apparatus incorporating the battery packs are inserted to carry out a charging operation, and a power source that provides power supply.

The voltage of the power source is sensed by a voltage sensing circuit of the charge control section and, when the voltage of the power source reaches a predetermined threshold, charging is started, thereby controlling the charging operation of the battery pack. This makes it possible to reduce the time taken in charging the plurality of battery packs. Further, the charging apparatus is made smaller in size by employing the rechargeable battery charging method as described above.

Figure 1:
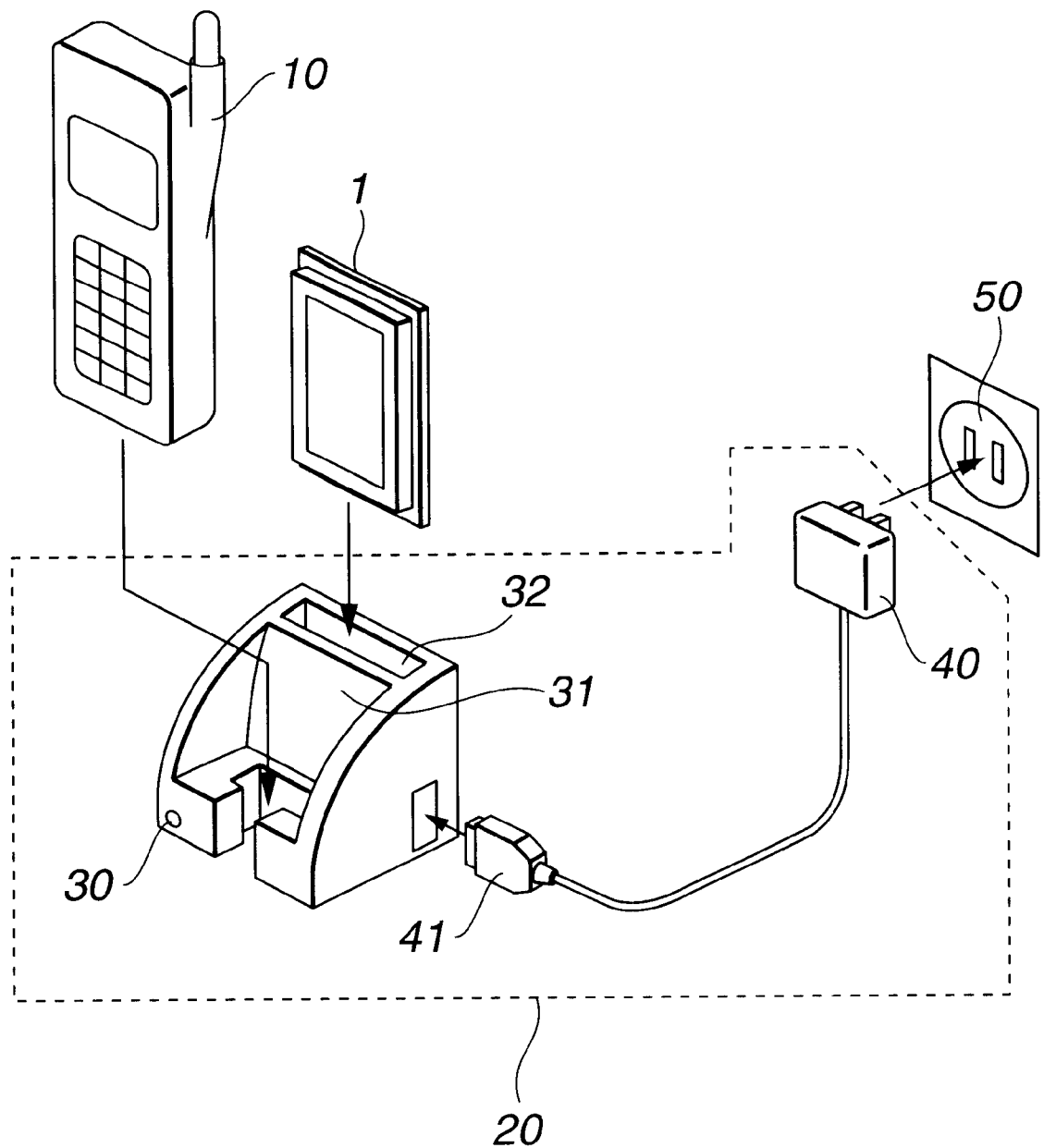
FIG. 1 shows an example of the constitution of the battery pack and the charging apparatus for charging the battery pack according to the present invention.

FIG. 1 shows an example of charging by using the charging apparatus and the battery pack exemplified as an embodiment of the present invention. In this embodiment, the case will be described in which the electronic apparatus used with the battery pack comprising the rechargeable battery mounted thereon is a portable telephone.

FIG. 1 shows a case of charging the battery pack 1 comprising the rechargeable battery and the portable telephone 10 having the battery pack mounted thereon, by using the charging apparatus 20 that has a charge adapter 30, to be described later, which has insertion slots for inserting the battery packs therein for charging, and an AC adapter 40 that is connected to an electrical outlet 50 of 100 VAC thereby to transform commercial alternate current power into direct current and supply the charge voltage.

Figure 2:
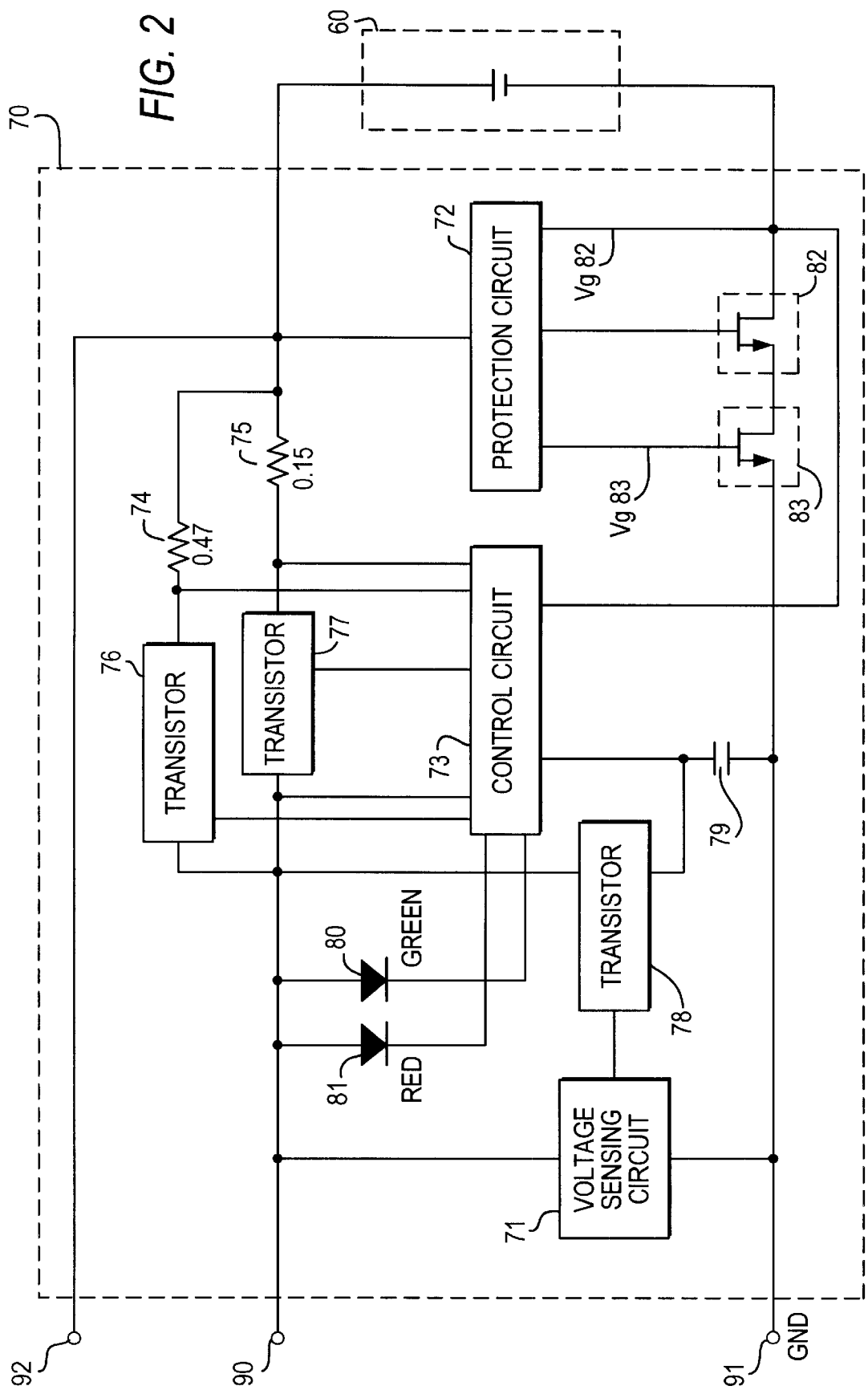
FIG. 2 is a block diagram showing an example of the constitution of the battery pack according to the present invention.

As shown in FIG. 2, the battery pack 1 has a rechargeable battery cell 60 that supplies current to the electronic apparatus connected thereto or is supplied with current from another power source and is charged, and a charge/discharge control section 70 that controls charge and discharge of the battery cell 60.

The charge/discharge control section 70 of FIG. 2 has a voltage sensing circuit 71 for sensing the output voltage of at least the AC adapter 40, a protection circuit 72 for sensing the voltage across terminals of the battery cell 60, and a control circuit 73 for controlling the charging operation.

The voltage sensing circuit 71 senses the charge voltage of the AC adapter 40 to control ON/OFF operation of a transistor 78, to be described later. In the voltage sensing circuit 71 of the battery pack 1 shown as the embodiment of the present invention, the threshold at which charging is started is set to, for example, 4.4V. The voltage sensing circuit 71 has such a sensing voltage so that the charging operation is started when the output voltage of the AC adapter 40 exceeds 4.4V.

The protection circuit 72 senses the voltage between the terminals of the battery cell 60 and sends a signal indicating the sensed voltage to the control circuit 73. When the voltage between the terminals of the battery cell 60 reaches 4.3V, for example, the protection circuit 72 notifies the control circuit 73.

The control circuit 73 carries out a control operation for charging the battery cell 60. Specifically, the control circuit 73 carries out such control operations as switching of the charging state between preliminary charging, constant current charging, constant voltage charging, turning on light emitting diodes (LED) 80, 81, and the like.

As shown in FIG. 2, current sensing resistors R74 and R75 are resistors for sensing and controlling the charge current. The current sensing resistor R74 has a resistance of 0.47 ohms, for example, and the current sensing resistor R75 has a resistance of 0.15 ohms. The current sensing resistors R74 and R75 are switched by the switching operation of transistors 76 and 77 to be described later that are controlled by the control circuit 73. This controls the amount of charge current.

The transistors 76, 77, and 78 are switching semiconductor devices. The transistors 76 and 77 are controlled to turn on or off by the control circuit 73, thereby to select the current sensing resistors R74, R75 for sensing and controlling the charge current, and switch the circuit. The transistor 78 is controlled to turn on or off according to the output voltage of the AC adapter 40 that is sensed by the current sensing circuit 71.

The control circuit 73 is controlled to turn on or off by the switching operation of the transistor 78 that is controlled by the voltage sensing circuit 71. The capacitor 79 is an external capacitor device of an oscillation circuit that outputs pulses of a predetermined frequency, thereby setting a timing between the start of charging and standby for charging. An oscillation circuit described above starts to oscillate when the output voltage of the AC adapter 40 exceeds the sensing voltage 4.4V of the voltage sensing circuit 71. The capacitor 79 also functions as a charge timer to determine the duration of the preliminary charging period and the duration of the constant voltage charging period after sensing the state of full charging. By a switching of the transistor 78 by a control signal from the voltage detection circuit 71, the capacitor 79 is charged when the voltage at charging terminal 90 is over 4.4V. The capacitor 79 is discharged according to the time constant of the capacitor 79 in the circuit when the voltage at the charging terminal 90 is less than 4.2V.

The LED 80 is a light emitting diode that emits green light, and the LED 81 is a light emitting diode that emits red light. The LED 80 and the LED 81 are controlled to turn on and off by the control circuit 73 according to the charging state of the battery pack 1.

The discharge control transistor 82 is a field effect transistor (FET) that stops the discharging operation when a discharge terminal 92 and a GND terminal 91 are short-circuited, or when the battery cell 60 is over-discharged and the voltage between the terminals thereof falls below a predetermined voltage level. The predetermined voltage level is, for example, 2.5V.

The charge control transistor 83 is also an FET and stops the charging operation when the battery cell 60 is being charged if the voltage between the terminals thereof has exceeded a predetermined voltage level. The predetermined voltage level is 4.3V.

Thus, each transistor 82 and 83 works as a switching element to protect the battery 60 in different respective situations and as shown are connected in series to protect the charging state and discharging state, respectively.

As shown in FIG. 2, the protection circuit 72 provides a gate bias voltage Vg82 fed to transistor 82 and a gate bias voltage Vg83 fed to transistor 83. In the circuit of FIG. 2, the direction of the charging current flow is from charging terminal 90 to transistor 76 through resistor 74 to battery 60 and out of battery 60 to transistor 82 and transistor 83 to ground terminal 90. In the over-discharged state or the fully charged up state described above, transistor 82 and/or transistor 83 is/are controlled to be in the cut-off state by being supplied with a lower gate bias voltage (Vg82, Vg83). As a result, transistor 82 works as a protector in the over-discharging state, and transistor 83 works as a protector in an over-charging state.

The battery pack 1 is provided with, in addition to the components described above, a charge terminal 90 used in charging, the GND terminal 91, and the discharge terminal 92 used in discharging. The GND terminal 91 is used for both charging and discharging in common.

The charge terminal 90 and the GND terminal 91 are connected to connection terminals, not shown in the drawing, which are provided in the unit insertion slot 31 and in the battery pack insertion slot 32 of the charge adapter 30 at specified positions therein, thereby to take the charge current supplied from the AC adapter 40 into the battery pack 1. The discharge terminal 92 and the GND terminal 91 are connected to connection terminals, not shown, that are provided at specified positions on the portable telephone 10, thereby to supply electric power to the portable telephone 10.

The charging apparatus 20, on the other hand, is constituted from the charge adapter 30 that has the insertion slots for mounting the battery pack 1 and the portable telephone 10 therein, and the AC adapter 40 that is connected to the 100 VAC electrical outlet 50 to generate the charge current.

As shown in FIG. 2, charge adapter 30 has the unit insertion slot 31 that allows it to charge the battery pack 1 while being mounted in the portable telephone 10, and the battery pack insertion slot 32 that is capable of separately charging the battery pack 1 being removed from the portable telephone 10. The charge adapter 30 and the AC adapter 40 are detachably connected by means of a connector 41.

Figure 3:
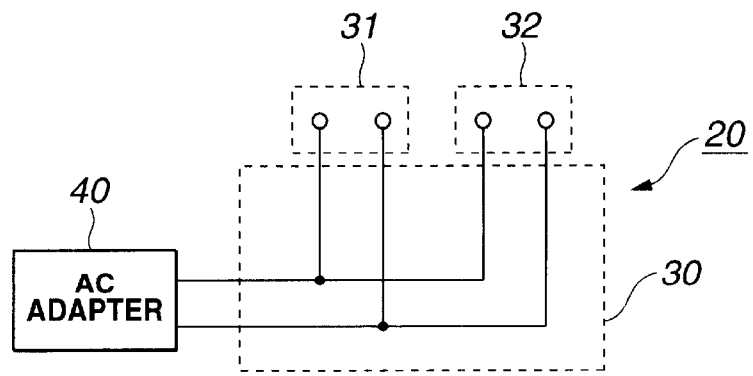
FIG. 3 is a block diagram showing an example of the constitution of the charging apparatus according to the present invention.

As shown in FIG. 3, the AC adapter 40 transforms alternating current of the 100 VAC commercial power supply into direct current and generates the charge current to supply it to the unit insertion slot 31 and the battery pack insertion slot 32 in parallel.

Although not shown in the drawing, the power supply terminals of the unit insertion slot 31 and of the battery pack insertion slot 32 are provided at such positions as will be engaged with the charge terminal 90 and the GND terminal 91 when the portable telephone 10 or the battery pack 1 is inserted into the slot.

The charging apparatus 20 has a simple structure wherein the charge current from the AC adapter 40 is connected to the charge terminals of the slots in parallel.

Operation of charging one of the battery packs 1 described in detail above by means of the charging, apparatus 20 will be described below with reference to FIG. 4.

The charging apparatus 20 described as the embodiment of the present invention carries out preliminary charging, constant current charging and constant voltage charging operations according to the voltage between the terminals of the battery pack 1.

First, when the battery pack 1 which has not been charged, is inserted into the slot, the protection circuit 72 senses the voltage between the terminals of the battery cell 60. When the voltage between the terminals is below 2.0 V, the control circuit 73 starts preliminary charging and turns on the red LED 81 indicating that the battery is being charged.

The preliminary charging continues till the voltage between the terminals of the battery pack 1 exceeds 2.0 V, or for a certain period of time such as 30 minutes. When the voltage between the terminals of the battery pack 1 exceeds 2.0 V, preliminary charging is completed and is followed by the next stage of constant current charging. However, in case the voltage between the terminals of the battery pack 1 does not exceed 2.0V in 30 minutes, the control circuit 73 stops charging and, for example, causes the red LED 81 to flash so as to indicate that the battery pack 1 is defective. In the preliminary charging, only the transistor 76 is made conductive and the current is limited so that the voltage across current sensing resistor R74 is 23.5 mV.

When the voltage across the terminals of the battery pack 1 which has not been charged is 2.0 V or higher and below 4.10 V, the control circuit 73 starts constant current charging and turns on the red LED 81.

While the control circuit 73 starts constant current charging also in the case where the voltage between the terminals of the battery pack 1 which has not been charged is 4.10 V or higher, the battery pack 1 is already almost fully charged. Thus the control circuit 73 causes the green LED 80 to light, thereby indicating the state of standby for charging.

The voltage between the terminals of the battery pack 1 increases as the constant current charging proceeds. The current flowing during the constant current charging is determined by the capacity of the AC adapter 40. A low-power path on the transistor 76 side is capable of carrying current up to 132 mA, and a high-power path on the transistor 77 side is capable of carrying current up to 650 mA. Consequently, up to 781 mA can be carried when the low-power path on the transistor 76 side and the high-power path on the transistor 77 side are combined.

When the incoming current exceeds 781 mA, the control circuit 73 senses the excessive charge current and stops charging. In the constant current charging, current is limited when the voltage across the current sensing resistor R74 in the low-power path reaches 62.0 mV. The control circuit 73 also limits the current and stops charging when the voltage across the current sensing resistor R75 in the high-power path reaches 97.5 mV.

Figure 4:
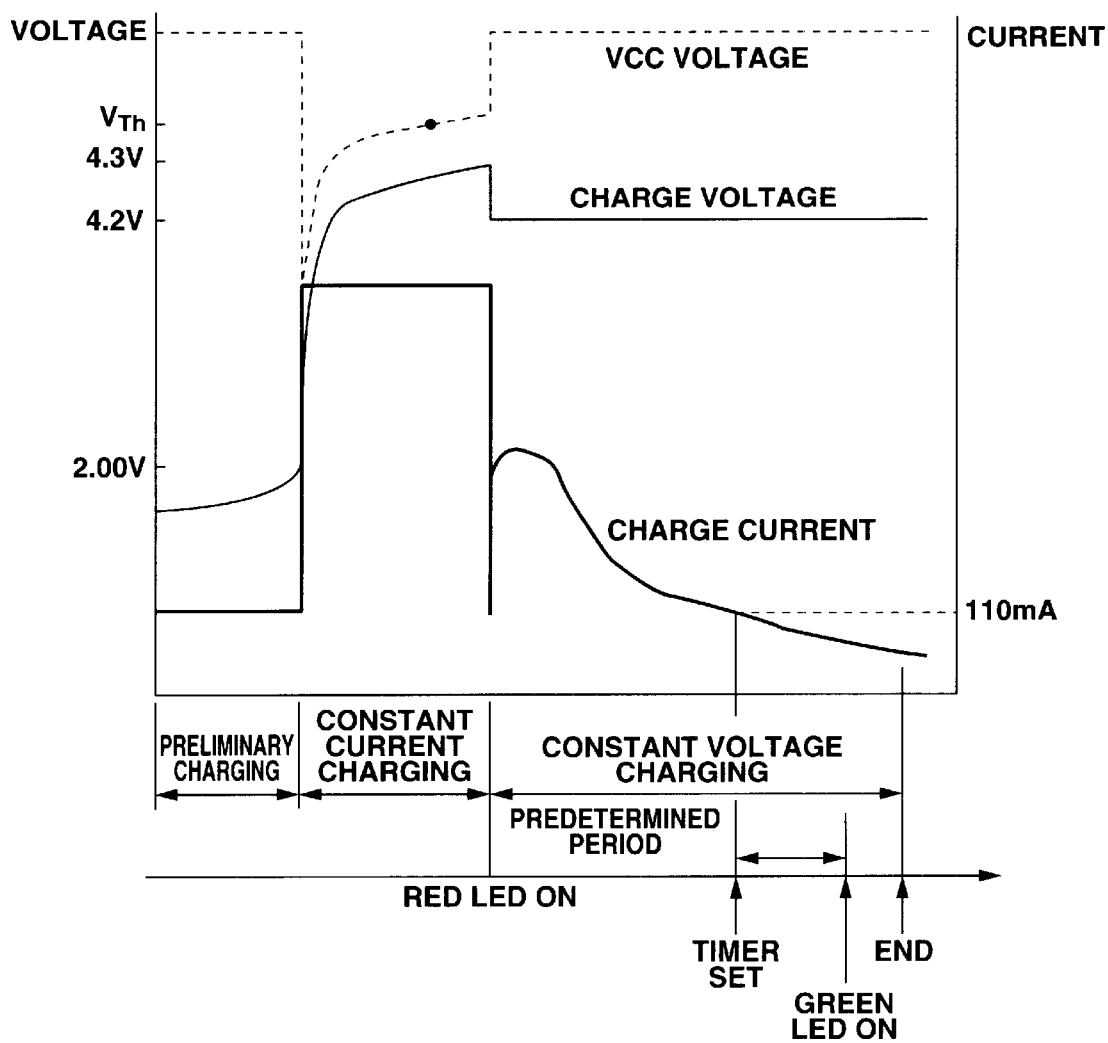
FIG. 4 shows changes in time of voltage across terminals of the battery pack and of the output voltage of an AC adapter during charging by means of the charging apparatus of the present invention.

As represented in FIG. 4, constant current charging continues till the voltage between the terminals of the battery pack reaches 4.30 V maximum. When the protection circuit 72 senses the voltage between the terminals of the battery cell 60 exceeding 4.30 V, the control circuit 73 switches from constant current charging to constant voltage charging. Thereafter constant voltage charging is carried out while decreasing the voltage by 0.1 V to 4.20 V.

$V_{Th}$ in FIG.4 represents a hysteresis voltage of the voltage sensing circuit 71. When the output voltage of the AC adapter 40 reaches this voltage level during charging of the plurality of battery packs 1 to be described later, the voltage sensing circuit 71 switches to start charging.

In the constant voltage charging, the voltage between the terminals of the battery cell 60 remains constant at 4.20 V, while the charge current gradually decreases with time. In the constant voltage charging, the transistor 77 in the high-power path is controlled in a state of substantially off, so that current hardly flows. As a result, while constant charge current of 132 mA flows in the transistor 76 in the low-power path, the current gradually decreases because a small amount of current is supplied also to the high-power path.

When the charge current gradually decreases to a predetermined value, the control circuit 73 sets a full-charge sensing timer to start counting. Upon lapse of a predetermined period of time, the control circuit 73 causes the green LED to light indicating the completion of charging. When another predetermined period of time has passed, the charging operation ends. In the embodiment of the present invention, the predetermined current described above is 110 mA.

Pulse charging may also be carried out in the preliminary charging and the constant voltage charging stages, in order to reduce the heat generation from the transistors 76 and 77 when the VCC voltage of the control circuit 73 is 5.05 V or higher. Also after charging has been completed, charging may be restarted in the case where the voltage between the terminals of the battery pack 1 drops to below 4.20 V.

Figure 5:
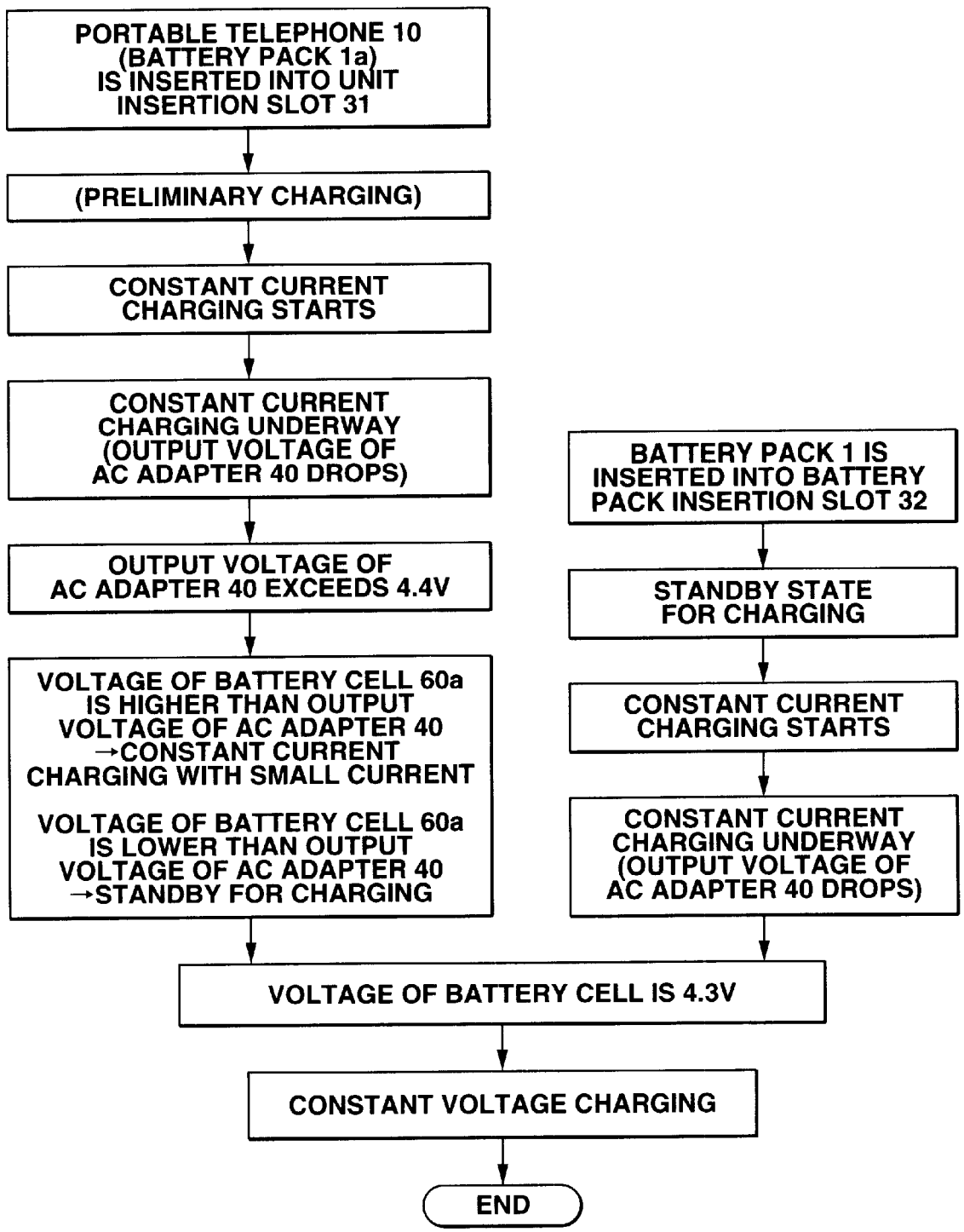
FIG. 5 is a drawing for explaining the charging operation when a battery pack is charged by means of the charging apparatus of the present invention.

Operation of charging a plurality of battery packs by the charging apparatus 20 that charges the battery pack 1 described above will now be described below with reference to FIG. 5. In FIG. 5, for the convenience of description, the battery pack that is charged while being incorporated in the portable telephone 10 will be referred to as battery pack 1a and the battery pack that is charged separately will be referred to as battery pack 1. Although each battery pack has the same constitution, components of the battery pack 1a will be denoted with the reference numeral followed by letter "a" added thereto.

The description that follows deals with such an operation where the battery pack 1a mounted in the portable telephone 10 is inserted in the unit insertion slot 31, then the battery pack 1 is inserted in the battery pack insertion slot 32, and charging is carried out. The battery pack 1a incorporated in the portable telephone 10 and the separate battery pack 1 are identical, and there is no difference in the charging operation and charging performance, between the case of charging the battery pack incorporated in the portable telephone 10 and the case of charging the battery pack separately, due to the difference in sizes of the slots. Therefore, the difference between the unit insertion slot 31 and the battery pack slot 32 and the difference in the order of charging are ignored.

When the battery pack 1a incorporated in the portable telephone 10 is inserted into the unit insertion slot 31, the protection circuit 72a senses the voltage between the terminals of the battery cell 60a. In the case where the voltage between the terminals is 2.0 V or higher, constant current charging is started. When the voltage is below 2.0 V, the control circuit 73a carries out preliminary charging till the voltage between the terminals becomes 2.0 V or higher, and then starts constant current charging. When constant current charging is started, voltage of the AC adapter 40 decreases.

When the battery pack 1 is inserted in the battery pack insertion slot 32 at this time, the voltage sensing circuit 71 for the battery pack 1 senses the output voltage of the AC adapter 40. When the output voltage is below 4.4 V at which the charging operation can be started, the voltage sensing circuit 71 effects a standby state for charging.

In the unit insertion slot 31, the battery pack 1a is still being charged with the constant current. As charging continues, the voltage between the terminals of the battery cell 60a recovers, and accordingly the output voltage of the AC adapter 40 gradually restores.

When the output voltage of the AC adapter 40 exceeds 4.4 V, which is the voltage at which the charging operation can be started, the voltage sensing circuit 71 for the battery pack 1 cancels the inhibition of oscillation of an oscillator in the control circuit 73. This starts constant current charging of the battery pack 1. As constant current charging is started, the voltage of the AC adapter 40 decreases again.

When it is detected that the output voltage of the AC adapter 40 has decreased to below 4.2 V, which is the voltage causing the state of standby for charging, oscillation of the oscillator described above, is stopped. In the case where the voltage between the terminals of the battery cell 60*a* is higher than the power voltage of the AC adapter 40, charging of the battery pack 1*a* with the constant small current continues.

When the constant current charging of the battery pack 1 has started and voltage of the AC adapter 40 decreases below the voltage between the terminals of the battery cell 60*a*, the battery pack 1*a* is switched into the standby state for charging so that a reverse current does not flow from the battery cell 60*a* back into the AC adapter 40.

As charging of the battery pack 1 continues, the output voltage of the AC adapter 40 recovers and, when the output voltage becomes higher than the voltage between the terminals of the battery cell 60*a*, constant current charging of the battery pack 1*a* is resumed. At this time, since constant current charging of the battery pack 1 is being carried out also in the battery pack insertion slot 32, charging current from the AC adapter 40 slightly decreases due to the power consumption in both charging operations.

When both protection circuits 72 sense that the voltages between the terminals of the respective battery cells 60 have reached 4.3 V, the respective control circuits 73 stop the constant current charging and start constant voltage charging.

When the charging current gradually decreases to 110 mA, the control circuits 73 set the full-charge sensing timer. The control circuit 73 sets the timer and, upon lapse of a predetermined period of time, causes the green LED to light. When another predetermined period of time has passed, the charging operation ends.

As described above, by providing the charge control section 70 in the battery pack 1, it is possible to control the charging operation to turn on and off according to the voltage of the AC adapter 40 monitored by the voltage sensing circuit 71.

Also because the charging apparatus 20 described above does not require a charging circuit, construction of the charging apparatus 20 can be simplified. Since the battery pack 1 has the charge control section 70, the charging apparatus 20 is required only to have a plurality of slots while being capable of charging the plurality of battery packs without modifying the construction thereof such as providing an additional charging circuit.

By using the battery pack 1 and the charging apparatus 20, time taken to simultaneously charge the plurality of battery packs with the constant voltage is made equal to the time required for constant voltage charging of one battery pack. Consequently, according to the rechargeable battery charging method that employs the battery pack 1 and the charging apparatus 20 described above, the time required in this charging process can be reduced in comparison to the case of using the charging apparatus of the prior art.

The foregoing description assumes that the battery pack 1 is a lithium ion rechargeable battery, although there is no limitation to the type of battery pack as long as it is a rechargeable battery. There are also no limitations to the types of the active material of the electrode and the electrolyte that constitute the battery cell 60, nor of the configuration of the battery cell 60, and the like.

Also there are no limitations to the form and mechanism of the charge terminal 90 and GND terminal 91 that supply the charge current and of the discharge terminal 92 and GND terminal 91 that are connected to the portable telephone 10. For example, non-contact power transmission means or the like may be used for the charge terminal 90 and the GND terminal 91.

When the battery pack 1 is charged while being incorporated in the portable telephone 10, the charging apparatus 20 is also capable of charging while the portable telephone 10 is powered up.

The electronic apparatus that is used with the battery pack 1 incorporated therein is not limited to the portable telephone 10 and may be other electronic apparatus.

While the charging apparatus 20 receives the charge current from alternating current of the commercial power supply by using the AC adapter 40, the power source that supplies the alternating current may also be another battery or different power supply means. For example, an automotive battery may be used as the charging power source.

What is claimed is:

1. A charging apparatus comprising:
   a charge adapter having a plurality of battery insertion sections into which a battery pack having a charge control function to control charging of a rechargeable battery and/or an electronic apparatus incorporating said battery pack are respectively inserted; and
   a power source for supplying a charging current, wherein the charging current from said power source is supplied to said battery pack and/or to said electronic apparatus inserted into said plurality of battery insertion sections in parallel, and wherein
   said charge control function starts a charging operation when an output voltage of said power source exceeds a predetermined threshold.

2. A battery pack comprising:
   a rechargeable battery that is charged and discharged; and
   a charge control section for sensing an output voltage of a charge power source to control a start and stop of charging, wherein
   said battery pack is connected in parallel with another battery pack to said charge power source, and said charge control section of said battery pack senses a change in the output voltage of said charge power source due to charging of said another battery pack to control the start and stop of charging of said rechargeable battery of said battery pack, and wherein
   said charge control section starts a charging operation when said output voltage of said charge power source exceeds a predetermined threshold.

3. The battery pack according to claim 2, wherein said rechargeable battery comprises a lithium ion battery.

4. A rechargeable battery charging method, wherein a plurality of battery packs containing a respective plurality of rechargeable batteries are charged, comprising:
   a current supply step for supplying a charging current from a charge power source to said plurality of battery packs connected in parallel; and
   a charge control step for sensing a change in an output voltage of said charge power source due to charging of at least one battery pack among said plurality of battery packs and for controlling a start and stop of charging other ones of said plurality of battery packs, wherein wherein a charging operation is started when said output voltage is found to exceed a predetermined threshold in said charge control step.

5. The rechargeable battery charging method according to claim 4, wherein a charging operation is switched between a constant current charging operation and a constant voltage charging operation according to a voltage level of said plurality of battery packs as determined in said charge control step.

6. The rechargeable battery charging method according to claim 5, wherein said plurality of battery packs are charged individually in said constant current charging operation and said plurality of battery packs are charged simultaneously in said constant voltage charging operation.

7. The rechargeable battery charging method as described in claim 6 wherein said constant voltage charging operation for said plurality of battery packs is started when the voltage levels of all of said plurality of battery packs reach a predetermined voltage level.

8. The rechargeable battery charging method as described in claim 4 wherein said battery pack is provided with a lithium ion battery.

* * * * *